United States Patent
Voss et al.

(10) Patent No.: US 8,102,581 B2
(45) Date of Patent: Jan. 24, 2012

(54) LENS SYSTEM AND SCANNER DEVICE EQUIPPED THEREWITH

(75) Inventors: Andreas Voss, Stuttgart (DE); Martin Huonker, Dietingen (DE); Reiner Bruestle, Lauterbach (DE)

(73) Assignee: Trumpf Laser GmbH + Co. KG, Schramberg (DE)

( * ) Notice: Subject to any disclaimer, the term of this patent is extended or adjusted under 35 U.S.C. 154(b) by 771 days.

(21) Appl. No.: 12/098,918

(22) Filed: Apr. 7, 2008

(65) Prior Publication Data

US 2008/0259427 A1 Oct. 23, 2008

Related U.S. Application Data

(63) Continuation-in-part of application No. PCT/EP2006/009636, filed on Oct. 5, 2006.

(30) Foreign Application Priority Data

Oct. 7, 2005 (DE) ..................... 20 2005 015 719 U

(51) Int. Cl.
*G02B 26/08* (2006.01)

(52) U.S. Cl. ............... 359/205.1; 359/201.1; 359/201.2; 359/214.1; 359/215.1

(58) Field of Classification Search .... 359/196.1–226.2, 359/641–642, 662; 219/121.6–121.86, 121.74–121.8; 385/15–52
See application file for complete search history.

(56) References Cited

U.S. PATENT DOCUMENTS

| | | | | |
|---|---|---|---|---|
| 5,948,172 A | * | 9/1999 | Neiheisel | 134/1 |
| 6,061,183 A | * | 5/2000 | Nakai | 359/641 |
| 6,396,616 B1 | | 5/2002 | Fitzer et al. | |
| 6,452,132 B1 | * | 9/2002 | Fuse | 219/121.7 |
| 2004/0075912 A1 | | 4/2004 | Kim | |

FOREIGN PATENT DOCUMENTS

| | | |
|---|---|---|
| CN | 1497269 | 5/2004 |
| EP | 1 063 048 | 12/2000 |
| EP | 1 081 525 | 3/2001 |
| JP | 2001-051191 | 2/2001 |
| JP | 2001-062578 | 3/2001 |
| JP | 2004512549 | 4/2004 |
| WO | 0230675 A1 | 4/2002 |

OTHER PUBLICATIONS

Office Action from corresponding Chinese Application No. 200680045976.4, received Jan. 11, 2010, with English translation, 8 pages.
International Search Report and Written Opinion for corresponding PCT Application No. PCT/EP2006/009635, mailed Nov. 30, 2006, 12 pages.
Notification of Transmittal of translation of the International Preliminary Report n Patentability from corresponding PCT Application No. PCT/EP2006/009636, mailed May 8, 2008, 8 pages.
Office Action from Japanese Patent Office for corresponding Japanese Application No. 2008-533935, mailed Sep. 10, 2010, with English translation, 8 pages.

* cited by examiner

*Primary Examiner* — James Phan
(74) *Attorney, Agent, or Firm* — Fish & Richardson P.C.

(57) ABSTRACT

An F/theta lens system for focusing high-power laser radiation in a flat image field including at least two lenses. The at least two lenses are arranged sequentially in a beam path, where the at least two lenses are made from a material that is stable when exposed to laser radiation having a power of more than 1 kW, and at least one of the lenses has at least one aspherical lens surface.

7 Claims, 3 Drawing Sheets

LENS SYSTEM AND SCANNER DEVICE EQUIPPED THEREWITH

CROSS-REFERENCE TO RELATED APPLICATIONS

This application is a continuation-in-part of and claims priority under 35 U.S.C. §120 to PCT Application No. PCT/EP2006/09636, filed on Oct. 5, 2006, which claimed priority to German Application No. DE 20 2005 015 719.8, filed on Oct. 7, 2005. The contents of both of these priority applications are hereby incorporated by reference in their entirety.

TECHNICAL FIELD

The invention relates to an f/theta lens system for forming a flat image field and also a scanner device with such a lens system.

BACKGROUND

In materials processing with high power lasers, scanner devices are increasingly being used for the rapid positioning of the laser beam. As long as the beam deflection is performed with scanner mirrors in the (very nearly) collimated beam, for focusing a so-called f/theta lens system is used, which is characterized in particular by a large, planar image field. In the range up to about 1 kW average laser power, such f/theta lens systems are normally assembled from approximately six spherical lenses made from different and also highly refractive glasses. These lens systems are typically optimized for marking applications, i.e. these lens systems have a very high (almost diffraction-limited) imaging quality, but only a moderate power tolerance. In the range above 100-200 W average laser power, a marked shift of focus and a thermally conditioned degradation of the imaging quality typically occur. Above around 1 kW average laser power, the f/theta lens systems in current use can only be used for materials processing either in a very limited way or not at all, since marked deficits in the ability of the radiation to be focused and damage due to overheating of the lenses occur. Alternatively, beam guiding systems with beam deflection in the focused beam are used in scanner devices, in which the requirements on the lens system are lower. In any case, the usable working distance is considerably reduced by the scanner mirrors. In this case, the image field is severely spherically distorted, which is normally compensated by a z-adjustment of the lens. At large working distances—depending on the numerical aperture of the focused beam—the scanner mirrors required are very large, which restricts their dynamic behavior. From U.S. Pat. No. 6,396,616, a laser imaging system is known, the laser imaging system having a scanner mirror and an f/theta lens system with a spherical, an aspherical, and a toroidal lens, which acts as a reducing lens to increase the optical beam power.

SUMMARY

In contrast, the problem addressed by the present invention is to provide an f/theta lens system, which has reduced size and weight relative to conventional f/theta lens systems, and which in particular can also be operated at high power densities.

This problem is solved according to the invention by the fact that the lens system has at least two lenses arranged sequentially in the laser beam path, and the lenses are stable at a laser radiation power of more than 1 kW, where at least one lens has one or two aspherical lens surfaces. In some implementations, two lenses are arranged sequentially in the laser beam path. According to the invention, an f/theta lens system particularly suited to high-power applications is obtained by the fact that the number of lenses used is reduced to the minimum level required for the application. In some implementations, exactly two lenses are used. In an f/theta system, a lens included in the system is designed such that a height of an image produced by the lens is proportional to a scan angle rather than to the tangent of the scan angle. In order to be able to minimize the number of lenses at the required imaging quality, at least one aspherical lens surface is used. Aspherical lens surfaces have additional degrees of freedom in comparison to spherical surfaces, by means of which in particular higher order imaging errors, which become particularly important at large scanning angles, can be compensated for. In this arrangement, a complete flattening of the image field is dispensed with; instead, a so-called average flattening is performed, i.e., an astigmatism dependent on the deflection angle remains in the focused beam.

In another embodiment, at least one lens consists of synthetic quartz glass. In some implementations, all of the lenses include synthetic quartz glass. The selection of the optical materials for the lenses takes place in particular with regard to low absorption of laser beam radiation, low thermo-optical effects and high stress resistance. An optical material that has low absorption of laser beam radiation, low thermal-optical effects, and high stress resistance can be considered to be a material that is stable when exposed to the laser beam radiation in that the optical properties of such a material are not altered when the material is exposed to the laser beam radiation. The optical properties of the material that are not altered can include, for example, transmission of the material and absorption of the material. An example of a stable material for laser radiation with a power of more than 1 kiloWatt (kW) in the ultra-violet, visible, and near-infrared (UV/VIS/NIR) region (approximately 170 nm-3 µm) is synthetic quartz glass. Synthetic quartz glass can be used as a stable material in a system in which the laser beam is generated by a solid state laser (such as a YAG laser) that produces a laser beam having a radiation power of 1 kW or greater and a laser beam having a wavelength between 170 nm and 3 µm and more particularly between 0.75 µm and 1.4 µm. The laser can have a wavelength of 1.3 µm. The laser beam produced by the laser can be pulsed or continuous.

A disadvantage is the low refractive index (n) of quartz glass (n~1.45), which—in comparison to highly refractive optical glasses (n~1.65-1.85), such as are used in standard f/theta lens systems—leads to more strongly curved surfaces and, thus, in general to higher imaging errors, and increased losses at the antireflection coatings. A material having an index of refraction below about 1.65, below about 1.55, or below about 1.45 can be considered to be a low refractive index material. In addition, when using one type of glass exclusively (e.g., quartz glass), no achromatic lens system can be implemented. The dispersion of quartz glass in the VIS and NIR range is sufficiently low however, such that the chromatic errors occurring, e.g., when using coaxial observation through the lens system remain within acceptable limits. Other optical materials that have low absorption, low thermo-optical effects and a high thermal resistance (e.g., YAG or sapphire), can also be used as the lens material.

In another embodiment, the first lens in the beam path is a spherical meniscus lens. The meniscus lens is as strong as possible on the object side, i.e. approaching hemispherical in shape, with a concave curve, to enable a flattening of the image field (on average) by beam divergence at the lowest possible lens thickness. The second side of the meniscus lens is preferably approximately concentric to the first, such that overall a low (negative) refraction power results.

In another embodiment, the second lens in the beam path is a focusing lens with an aspherical lens surface. The aspherical focusing lens can be implemented as a planar convex lens, meniscus lens or as a biconvex lens, and the aspherical focusing lens effects the focusing of the beam and the minimization and for reduction of spherical aberration, astigmatism and higher order errors. In addition, the focal length of the lens system is determined by the refraction power of the focusing lens.

In another aspect, a scanner device for materials processing with a laser beam includes at least one planar scanner mirror for deflecting the laser beam and an f/theta lens system arranged downstream in the beam path as described above, and can be operated at laser radiation power levels of over 1 kW.

In some embodiments, a wavefront correction optics are arranged in the beam path in front of the f/theta lens system. The wavefront correction optics can be used to perform a first correction to the wavefront of the radiation to be focused as a contribution to minimizing the required number of lenses in the f/theta lens system, prior to the scanner mirrors.

In some embodiments, the wavefront correction optics have a collimating lens with one or two aspherical lens surfaces. Normally, a spherical collimating lens is provided in the scanner device for collimating the divergent beam emerging from an optical fibre. The aspherical collimating lens replaces the conventional collimating lens, which is intended to generate only a best possible parallel beam. As well as the collimation, the aspherical collimating lens also performs a fine correction of the wavefronts, which in interaction with the two lenses of the f/theta lens system, averaged over the scan region can enable a better imaging quality than would be possible with a conventional collimating lens. The aspherical collimating lens takes on among other things a part of the correction of the spherical aberrations.

In some implementations, the wavefront correcting optics have a phase correcting plate, which is used for correcting the wavefront. This can be combined with e.g. a conventional, spherical collimating lens.

Further advantages and advantageous configurations of the subject matter of the invention can be found in the description, the drawings and the claims. Equally the above cited and further features listed can be used alone or in multiples in arbitrary combinations. The embodiment shown and described is not to be understood as an exhaustive description, but rather has an exemplary form for describing the invention.

DETAILED DESCRIPTION

Figure 1:
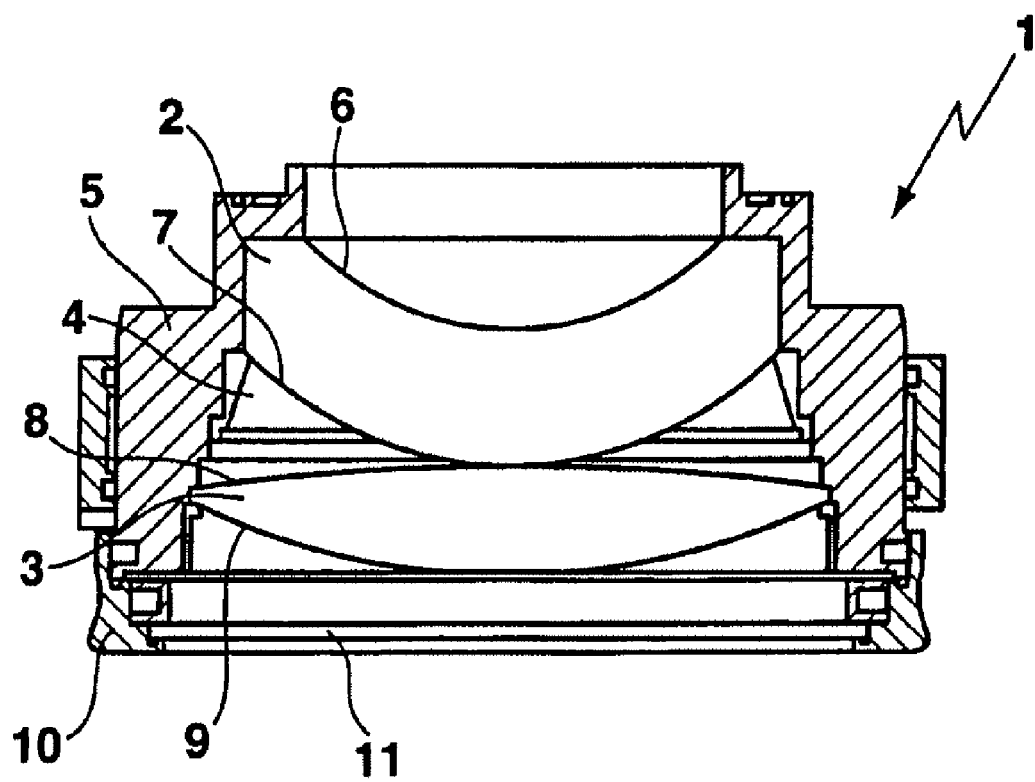
FIG. 1 is a drawing of a longitudinal section an f/theta lens system.

The f/theta lens system 1 shown in FIG. 1 includes a meniscus lens 2 and a focusing lens 3, which are mounted in a lens mount 4. The lens mount 4 is arranged in a lens housing 5.

The meniscus lens includes a curved first lens surface 6 on the object side of the meniscus lens 2 and a second lens surface 7 on the image side of the meniscus lens 7. The curved first lens surface 6 has an approximately hemispherical concavely curved surface. The curved first lens surface 6 enables a flattening of the image field (on average) by beam divergence at the lowest possible lens thickness. The second, image-side lens surface 7 of the meniscus lens 2 is approximately concentric to the first lens surface 6, such that overall a low (negative) refraction power results.

The focusing lens 3 is a biconvex lens with a spherical lens surface 8 and an aspherical lens surface 9. The focusing lens 3 focuses a laser beam (not illustrated in FIG. 1) while minimizing or reducing spherical aberration, astigmatism and higher order errors due to the exploitation of additional degrees of freedom, which are induced by the aspherical lens surface 8. The focal length of the f/theta lens system 1 is determined by the refraction power of the focusing lens 3.

The f/theta lens system 1 also includes an image-side support 10 for a protective glass 11, which can be snapped on to the housing 5 of the lens system 1, as described in more detail in DE 20 2004 019 487.2.

The meniscus lens 2 and the focusing lens 3 include water-free, synthetic quartz glass, which allows a very low absorption of the laser radiation and a low thermal expansion of the lens system to be achieved while simultaneously increasing the power tolerance of the lens system 1 to at least 4-6 kW. The synthetic quartz class can be considered to be stable when exposed to the laser radiation, even when the radiation has a power of more than 1 kW. The optical properties (such as transmission and absorption) of the synthetic quartz class are not modified by exposure to the laser radiation having a power of more than 1 kW. In addition, with the construction form shown in FIG. 1, weight and size savings can be achieved relative to a conventional f/theta lens system that a typically has larger number of lenses. Due to the minimized component count, and despite the use of aspherical lenses that are more expensive compared to spherical ones, the optical system is nevertheless able to be manufactured at low cost overall.

Figure 2:
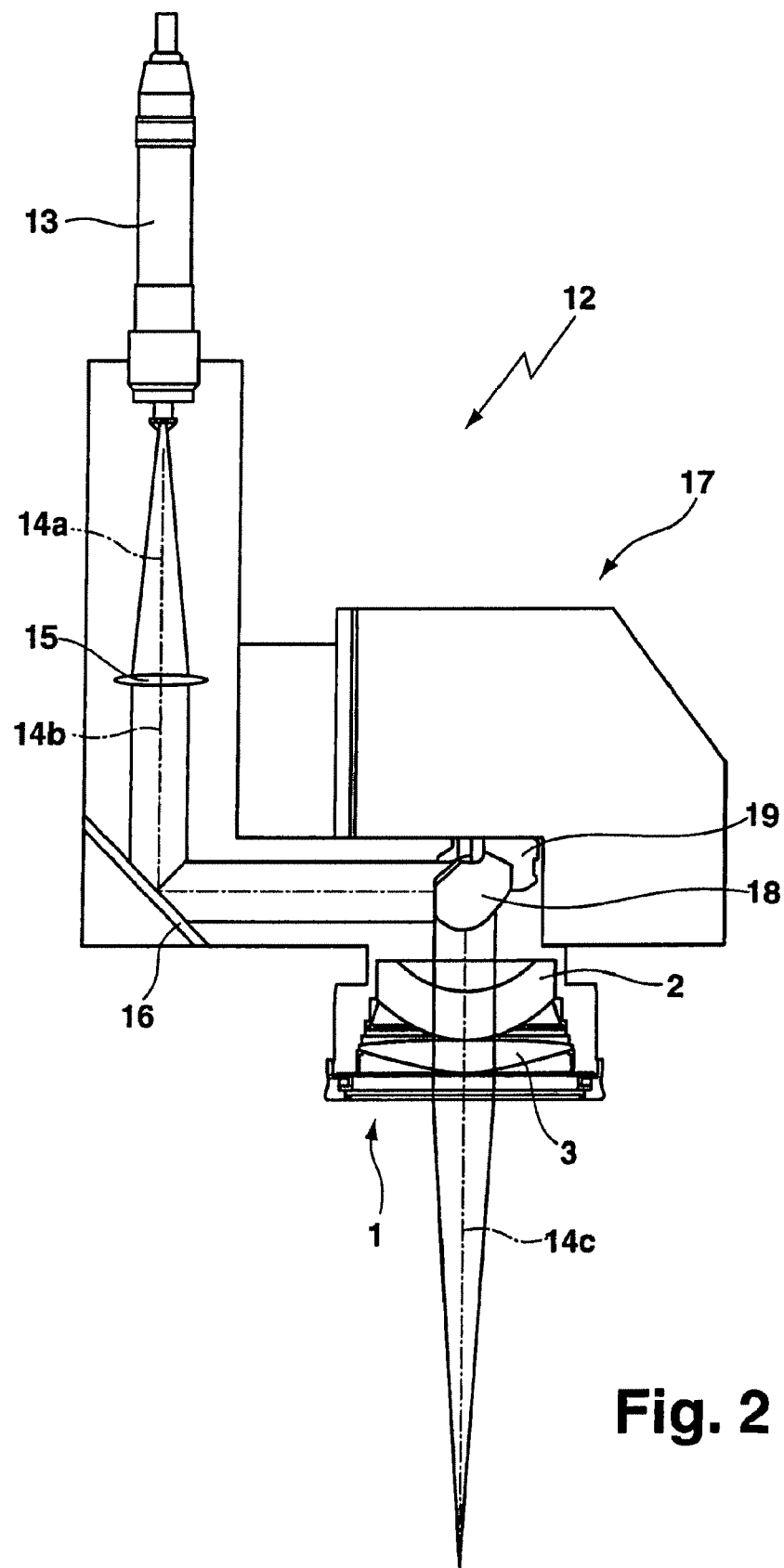
FIG. 2 is a drawing of a longitudinal section of a scanning device equipped with the f/theta lens system of FIG. 1.

FIG. 2 shows the f/theta lens system 1 discussed above with respect to FIG. 1 in the assembled condition in a scanner device 12 for materials processing. The scanner device 12 includes an optical fiber 13, from which a divergent laser beam 14a with high beam power (e.g., beam power>1 kW) emerges, and passes vertically through the scanner device 12. By a collimating lens 15, the laser beam 14a is transformed into again a vertically extending, collimated laser beam 14b.

Figure 3:
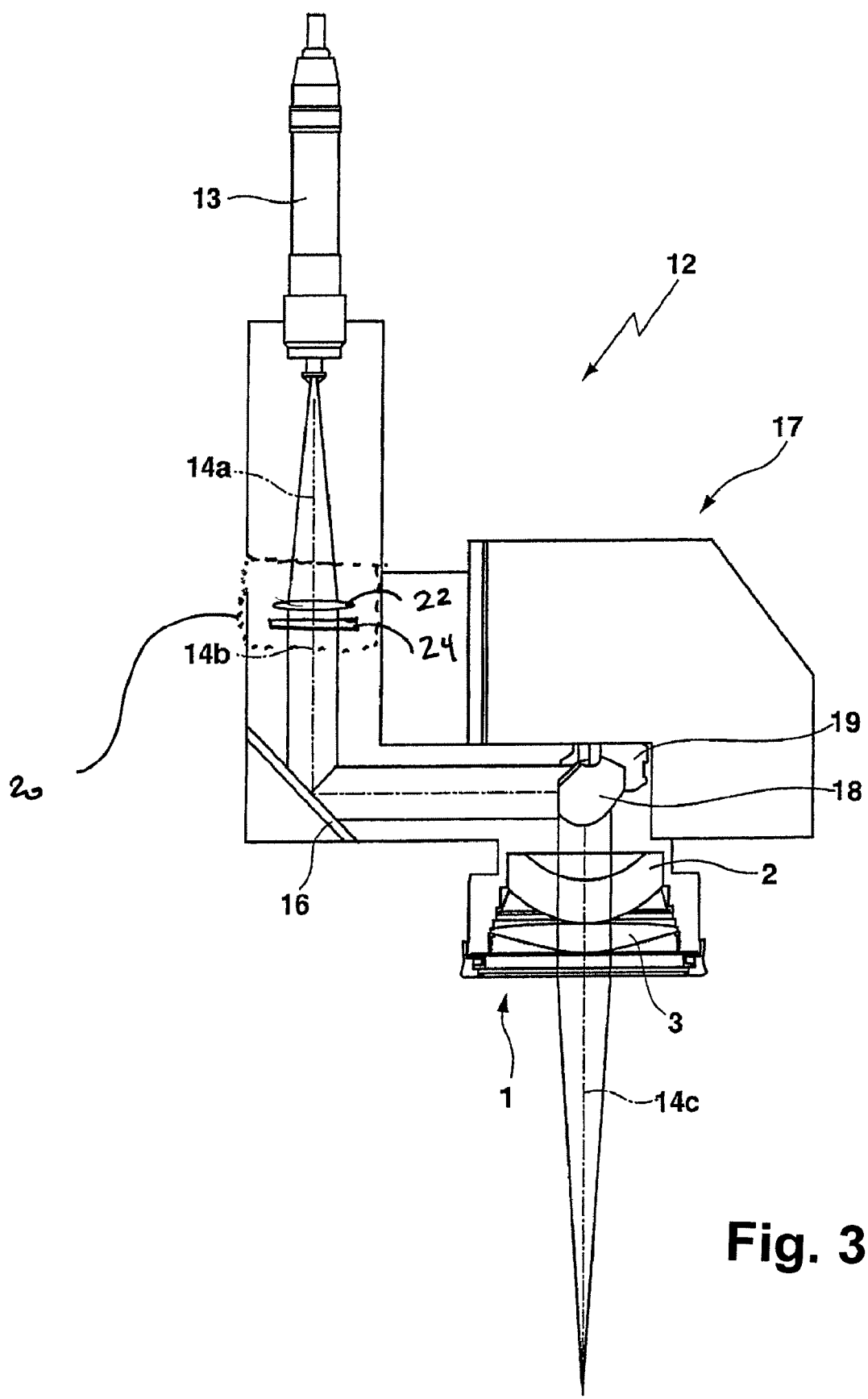
FIG. 3 is a drawing of a longitudinal section of a scanning device equipped with the f/theta lens system of FIG. 1 and a phase correction plate.

In contrast to a conventional collimating lens, which is intended only to generate a best possible parallel beam, the collimating lens 15 has a specially optimized aspherical lens surface. In addition to the beam collimation, the collimating lens 15 also serves as a wavefront correction optics and performs a fine correction of the wavefronts. In particular, the collimating lens 15 provides part of the correction of the spherical aberrations, which in interaction with the meniscus lens 2 and the focusing lens 3 of the f/theta lens system 1 facilitates a better imaging quality on average over the scanning area than would be possible with a conventional collimating lens. Alternatively, and referring briefly to FIG. 3, the aspherical collimating lens 15 can be replaced by a combination 20 of a spherical collimating lens 22 and a phase correcting plate 24. The phase correcting plate 24 can be a piece of glass with a flat surface. The phase correcting plate 24 is shown positioned downstream from the lens 22, but in some designs the phase correcting plate 24 can be positioned upstream from the lens 22.

Referring again to FIG. 2, the collimated laser beam 14b is deflected on a deflecting mirror 16 by 90° from the vertical into the horizontal direction and enters a scanning head 17 via an entry aperture. In the scanning head 17, the collimated laser beam 14*b* first impinges on a planar X-scanner mirror 18, which deflects the beam in the X-direction on to a planar Y-scanner mirror 19, which deflects the beam further in the Y-direction. The X-scanner mirror 18 and the Y-scanner mirror 19 are attached to galvanometers (not shown) and can be rotated. The position of the rotational axis of the galvanometers determines the deflection angle of the respective scanner mirror 18, 19 and, thus, the position of the laser beam in the image field (not shown).

The collimated laser beam 14*b* leaves the scanner head 17 through an exit opening, which is equipped with the f/theta lens system 1 discussed above with respect to FIG. 1. This causes, due to the meniscus lens 2, a divergence of the laser beam 14*b* for generating as large an image field as possible, and due to the downstream focusing lens 3 the conversion of the divergent laser beam into a convergent laser beam 14*c*, which is focused at a focal point, about which the lens arrangement in the f/theta lens system 1 generates an image field that is flat on average.

Since the optical system present in the scanner device 12 is not completely corrected (a completely corrected optical system can be referred to as "diffraction-limited"), the aim is to keep the imaging errors at all deflections of the scanner mirrors 18, 19 within manageable limits. This takes into account the fact that at small deflections of the scanner mirrors 18, 19, a degradation of the image occurs in comparison to a system composed of spherical lenses. The intentional wavefront distortion of the collimated laser beam 14*b* by the collimating lens 15 or also by a separate correcting plate generates a significant improvement in the imaging at the critical large deflections of the scanner mirrors 18, 19, while at small deflections the wavefront distortion causes a minor and therefore acceptable degradation. In the f/theta lens system 1, due to the use of synthetic quartz glass as a particularly power-capable optical material, the chromatic aberration correction is intentionally dispensed with. Furthermore, a certain residual astigmatism remains because only one average image flattening takes place. Contrasted with this is a considerable reduction in costs and weight due to the use of a lower number of optical components in the f/theta lens system 1, and a considerably higher laser stability even at laser power levels above 1 kW up to approximately 10 kW. It is only this that facilitates the use of f/theta lens systems in high-power applications in which a beam deflection takes place in the collimated beam.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A scanner for a high-power laser beam, the scanner comprising:
   at least one planar scanner mirror in a beam path of a laser beam for deflecting the laser beam;
   a lens system downstream of the at least one planar scanner mirror in the beam path, the lens system comprising:
   two lenses arranged sequentially in the beam path, wherein the two lenses comprise synthetic quartz glass that is stable when exposed to a laser radiation having a power of more than 1 kW, and at least one of the lenses has at least one aspherical lens surface; and
   wavefront correcting optics in the beam path and upstream of the at least one planar scanner mirror, the wavefront optics comprising a collimating lens having at least one aspherical lens surface or a spherical collimating lens and a phase correcting plate.

2. The scanner of claim 1, wherein the phase correcting plate comprises a glass plate having a flat surface.

3. The scanner of claim 1, wherein the at least one planar scanner mirror for deflecting a laser beam having a laser radiation power of more than 1 Kilowatt deflects the laser beam by 90 degrees.

4. The scanner of claim 1, wherein the at least one planar scanner mirror comprises a first scanner mirror for deflecting the laser beam onto a second planer scanner mirror for deflecting the laser beam through an opening into the lens system.

5. The scanner of claim 4, wherein the first planar scanner mirror and the second planer scanner mirror are enclosed within a scanning head.

6. The scanner of claim 1, wherein the laser beam emerges as a divergent laser beam from an optical fiber.

7. The scanner of claim 1, wherein the wavefront correcting optics corrects spherical aberrations in the laser beam.

* * * * *

UNITED STATES PATENT AND TRADEMARK OFFICE
CERTIFICATE OF CORRECTION

| | |
|---|---|
| PATENT NO. | : 8,102,581 B2 |
| APPLICATION NO. | : 12/098918 |
| DATED | : January 24, 2012 |
| INVENTOR(S) | : Andreas Voss, Martin Huonker and Reiner Bruestle |

It is certified that error appears in the above-identified patent and that said Letters Patent is hereby corrected as shown below:

Cover page, after Foreign Application Priority Data, delete "20 2005 015 719 U" and insert --20 2005 015 719.8--.

Column 6, line 34 (Claim 4, line 3), delete "planer" and insert --planar--.

Column 6, line 38 (Claim 5, line 2), delete "planer" and insert --planar--.

Signed and Sealed this
Seventh Day of August, 2012

David J. Kappos
*Director of the United States Patent and Trademark Office*